March 30, 1937.                    F. W. LYLE                    2,075,124
                              ELECTRICAL SYSTEM
                            Filed Nov. 13, 1934
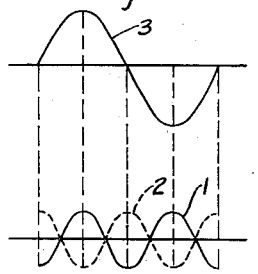
Fig. 1.
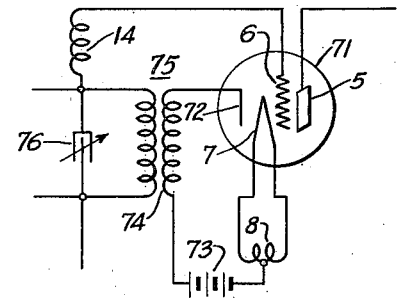
Fig. 3.
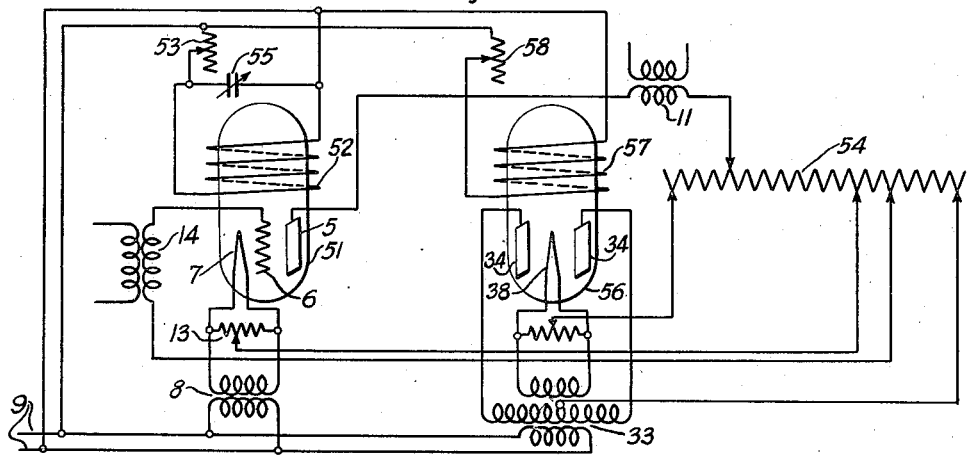
Fig. 2.
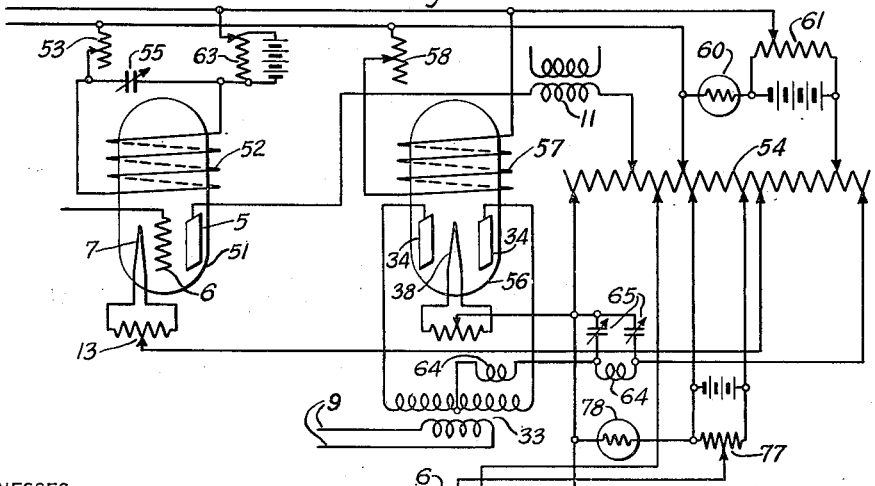
Fig. 4.
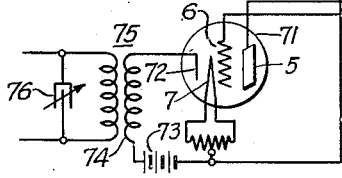
WITNESSES:
Leon J. Faya
Wm. C. Groome
INVENTOR
Frederick W. Lyle.
BY
F. W. Lyle,
ATTORNEY Patented Mar. 30, 1937

2,075,124

UNITED STATES PATENT OFFICE 2,075,124

ELECTRICAL SYSTEM

Frederick W. Lyle, Pittsburgh, Pa., assignor to Westinghouse Electric & Manufacturing Company, East Pittsburgh, Pa., a corporation of Pennsylvania Application November 13, 1934, Serial No. 752,818

9 Claims. (Cl. 250—27)

My invention relates to electrical rectifier, oscillator and amplifier systems and particularly to systems in which electrical-discharge devices, embodied therein, are supplied with current from alternating-current or fluctuating current sources. This application is a continuation-in-part of my application Serial Number 422,927, filed January 23, 1930, Patent No. 2,046,692, July 7, 1936.

In electrical systems employed to amplify or reproduce variable electrical currents, it is desirable that arrangements shall be such that the output current will vary only as the input quantity varies; in other words, wherever the input quantity remains invariable over a given time interval, the output current will likewise be constant and invariable. In oscillation generators it is desirable that the plate voltage source should be unvarying. When three-electrode tubes provided with heated cathodes are embodied in such systems, the foregoing conditions are satisfactorily met for many purposes if the source of current for the output circuit and the source of current for heating the cathode are constant-voltage direct-current sources, such as ordinary batteries. However, it would frequently be cheaper and more convenient if the alternating-current house-lighting supply instead of the batteries, could be utilized to supply current, but, to do so, arrangements must be devised to prevent the periodic variations of the alternating-current source or fluctuations in the direct current source of voltage from producing variations in the output circuit of the system.

As respects the source of current for the output circuit, double-wave rectifiers having filters provide a partially satisfactory solution of the problem under discussion, but, unless the filters are relatively large and expensive, a substantial ripple of second-harmonic frequency of the alternating-current supply is produced in the output current. Moreover, voltage sources are subject to certain random variations, frequently of slow variability, and to variations due to changes of load thereon. The employment of alternating current to heat the cathodes results in the production of a ripple, also of second harmonic frequency of the alternating-current supply, in the output circuit. Various means have been devised for minimizing this ripple; but its complete avoidance is prohibitively difficult and expensive in practice.

One principal object of my invention is to provide circuit arrangements which produce constant and invariable currents in the output circuits of systems of the kind described above, even when alternating-current or other fluctuating supplies are utilized for furnishing power for the output circuit and/or for heating the cathode. In accordance with one form of my invention, I achieve this object by balancing the effect of alternating heating current for the cathode against the effect of ripple in the output voltage of a rectifier supplying current to the output circuit; in accordance with other principles of my invention, I achieve the foregoing object by neutralizing the effect of fluctuations in voltage supplying the output of one or more three-electrode tubes in the system.

According to other forms of my invention, I neutralize the effects of alternating cathode-heating current, in tending to produce ripple in the output circuit of a three-electrode discharge-tube system by effects produced in the control electrode circuits.

In accordance with other principles of my invention, I avoid the production of harmonics in the output of a rectifier by effects produced on a control-electrode provided therein.

In still other arrangements, I neutralize or minimize the effects of fluctuations in the voltage supplied to the anode of an electrical discharge tube by impressing appropriate voltage variations on an input electrode, a screen grid, or a separate ancillary electrode in the tube; or by causing appropriate magnetic fields controlled to vary with the anode supply voltage, on the space traversed by electrons between anode and cathode in the tube.

Certain of the considerations upon which the foregoing methods of avoiding fluctuations in the output current are based will now be explained. It may be shown that, where an electron-discharge tube has its plate circuit supplied from a source of invariable direct-current voltage and its cathode is heated by alternating current, there are, at least, four factors which tend to produce, in the output circuit, ripples of the second harmonic frequency of the heating current; these factors are—

(1) "Voltage factor", i. e. the effect on current conduction to the anode of the alternating voltage-drop between terminals of the cathode.

(2) "Magnetic factor", i. e. the effect on current conduction to the anode of the alternating magnetic field due to the cathode-heating current.

(3) "Diversion factor", i. e. a tendency of electrons from that end of the cathode which is negative at any particular instant to be diverted from the anode to the positive end of the cathode.

(4) "Temperature factor", i. e. the effect on anode current of the variation in cathode electron-emission consequent upon periodic variations of cathode temperature as heating current increases and decreases in course of its alternating-current cycle.

The relative magnitudes and phases of the harmonics due to these four factors depend upon the physical propositions of the tube system and, hence, may be varied by design. It is possible, thus, to make the two factors last named negligible relative to the first two; and, for the sake of simplicity, it will be considered herein that such is the case, and the effect of the first two factors will be considered.

Analysis shows that the voltage factor tends to produce a harmonic having its positive maximum coincident, in time, with the maximum of the heating current, as indicated by the full-line sine curve 1 in Fig. 1; while the harmonic due to the magnetic factor has its negative maximum coincident in time with the heating-current maximum, as indicated by the broken sine curve 2, in Fig. 1. In other words, the voltage and the magnetic factor produce opposite effects; and, by proper design, can also be made equal in magnitude, thus causing them to neutralize each other, when so desired. Likewise, by design, either may be made dominant in effect.

The full-line sine curve 3, in Fig. 1, represents the fundamental-frequency heating current.

Analysis also shows that any other alternating field set up across the paths traversed by electrons in passing from cathode to anode, tends to produce a similar second harmonic ripple in the output current to that attributed in the foregoing to the cathode-heating current. The "magnetic factor" may, accordingly, be increased or decreased by setting up magnetic fields in the electron tubes through the agency of external windings.

It may be shown that the principal harmonic in output voltage of a full wave rectifier is a second harmonic of the frequency of the alternating-current supply, and that this second harmonic is the one which it is most difficult and expensive to eliminate by means of ordinary filters. It also appears that the positive maxima of these harmonics coincide in time with the maximum of the supply voltage; in other words, that these harmonics are co-phasal with those due to the voltage factor described above. They may, accordingly, be neutralized by a predominant magnetic factor of proper amount; or by externally impressed alternating magnetic fields; or by other means which are adapted to neutralize the effect of the "voltage factor".

It is well known that a voltage impressed between the grid and the cathode of an electron tube has the same effect on the output current as would a voltage of a certain greater magnitude impressed on the output circuit. In consequence, the tendency of fluctuating currents of any frequency to flow in the output circuit as a result of any factor or cause, such as those pointed out above, may be neutralized by impressing voltage of the same frequency and proper phase and magnitude on the grid (input) circuit, or upon an ancillary electrode, e. g. a screen grid, within the tube. This is equally true even though the fluctuations are caused by slow or random fluctuations of the anode-supply voltage; and fluctuations may also be prevented by impressing on the interelectrode space magnetic fields having half the frequency of the alternating current component in the fluctuation, or unidirectional magnetic fields fluctuating at the same frequency, as will be explained in more detail below.

Arrangements for deriving, from an alternating-current supply, second harmonic voltage, or, in fact, any other harmonic, are known in the art; saturated magnetic-core devices, such as the Joly frequency changer, being one example; and these may be utilized to obtain voltages of the desired harmonic frequency to impress upon the output or input circuit, as above mentioned. Rectifier output-circuits are also potential sources of second and other harmonic voltages for this purpose; and, as also will be shown, a cold electrode, in the same container as a hot cathode traversed by alternating current, can be made to draw harmonic currents suitable for this purpose.

With the foregoing principles in mind, other objects of my invention will be apparent upon reading the following specification in connection with the appended drawing in which—

Figure 1 is an explanatory diagram;

Fig. 2 is a schematic diagram of a tube system embodying certain principles of my invention; and Figs. 3 and 4 are schematic diagrams of a tube system embodying certain other principles of my invention.

Referring, in detail, to Fig. 2, which is intended to show one typical circuit arrangement to which my invention is applicable, the reference numeral 51 denotes a three-electrode electrical-discharge tube having an anode 5, a control-electrode 6 and a cathode 7. The cathode 7 may be a filament, heated, preferably, through the agency of a transformer 8, by current from the alternating-current supply circuit 9, which may be of ordinary commercial lighting frequency. While I here describe the cathode as a filament traversed by the heating current, the principles of my invention, insofar as they concern the "magnetic factor" in ripple production, are applicable to independently heated unpotential cathodes; and, where the heaters for unpotential cathodes are not completely closed in from the space containing the anodes and control electrodes, the principles relating to "voltage factors" are likewise applicable.

The anode 5, is supplied with current, through the primary 11 of an output transformer, from a source of unidirectional voltage, which is here shown as a potentiometer 54 traversed by rectifier current; but it will be obvious to those skilled in that art that certain principles of my invention are applicable when the source 54 is a battery or other source of invariable or only slowly variable unidirectional voltage. The control electrode 6 may be connected to the cathode 7, through a tap, to the potentiometer 54, thus giving electrode 6 a negative bias; but any other means, such as a "C" battery, may be employed to provide the desired bias for electrode 6, if desired. The anode and control-electrode circuits connect with the cathode 7 through a tap 13 so positioned as to be at the mid-potential of the cathode. In circuit between cathode 7 and control-electrode 6, is the secondary 14 of an input transformer, which carried a signal or other current to be amplified.

As stated in the foregoing explanation, the "voltage factor" and the "magnetic factor", due to the alternating current in the cathode of each, tend to produce second harmonic currents in the output circuit 11, but these effects are opposite in phase and may be made to neutralize each other by properly proportioning their respective magnitudes. It is possible, in fact, to calculate the magnitude of each for a given tube, and analysis shows that balance between the two requires a certain ratio of cathode voltage to current; that is to say, a certain cathode resistance.

It is usually necessary to design a cathode to give a certain anode current, and, hence, to yield a certain total electron emission. The negligible value requires that the heat-content of the cathode shall be great enough to prevent material decrease of electron emission while the heating current is near zero during the alternating-current cycle; in other words, the ratio of surface to mass of the cathode must not be too great. For a given geometrical form (a spherical cathode would be the optimum form, were this the only consideration) the ratio of the surface to mass decreases as the cathode diameter increases; hence, the cathode diameter and surface must be above a certain lower limit. This requirement fixes a maximum limit for specific electron emissivity of the cathode.

On the other hand, it can be shown that the balance point for "voltage factor" against "magnetic factors" depends upon the magnitude of the anode-circuit and grid-circuit voltages; and accidental variation of these must always be expected in practice. Analysis also shows that the magnitude of the harmonics resulting from unbalance due to a given percentage variation of grid or anode-circuit voltage is less as the total power input to heat the cathode is less. Hence, the power input to yield the desired electron emission should be minimized, as far as possible; that is to say, the cathode should be chosen, as regards material and operating temperature, to produce the above mentioned maximum limit electron emissivity and the minimum heat emissivity. This means that a given cathode material should operate as close to the temperature corresponding to the above mentioned maximum limit of electron emissivity as is consistent with obtaining good life; and, as between two different cathode materials so operated, that one which then has the lower operating temperature should be chosen.

As above stated, "temperature factor" may impose a limit on cathode dimensions, the balance of "voltage factor" against "magnetic factor" demands a certain value of resistance for the cathode. This means that the specific resistivity of the cathode filament may be fixed. It is, accordingly, desirable that the cathode should have the form of an alloy heater-base surfaced with electron-emissive materials; since the specific resistivity of the alloy base can be fixed at the required value by determining its composition independently of the character of its electron-emissive coating. Base filaments of certain alloys and having electron-emissive coatings, such as barium and strontium oxides have hitherto been utilized in electron tubes; but the character of the alloy was not determined by the foregoing considerations.

Since many metals have considerable temperature coefficients of resistance, accidental variation of the heater supply voltage would result when such metals were employed for base filaments, in variance from the value of cathode resistance, to produce the balance which avoids ripple, hence, it is desirable that the cathode-heater base be a material of nearly zero temperature coefficient. For this further reason, alloy bases, which alone can be given such temperature coefficients, are desirable. There will, accordingly, be a distinct advantage attained if alloy base filaments having emissive surfaces are employed as cathodes.

The foregoing described methods by which tubes provided with alternating-current cathode heating can be made to operate without ripple in their output circuits are feasible, provided no other causes of such ripple than the cathodes are present. Where the anode, control-electrode and loud-speaker-circuit-supply voltages are absolutely constant, this condition is approximated. However, it is frequently cheaper to use rectified voltages for these circuits which are not so elaborately and perfectly filtered as to meet this requirement and it is to certain such cases that the arrangement of Fig. 2 is applicable.

Let it be supposed that the potentiometer 54, of Fig. 2, is traversed by a current containing a harmonic frequency of the current supplied by source 56; a voltage of this harmonic frequency is present in the voltage impressed on the circuits of anode 5 and/or the control-electrode 6. As is explained in full detail in my aforesaid parent application, a frequency changer may be adjusted to derive a voltage of the same harmonic frequency from source 9 and to impress it on the control-electrode 6. If this last named harmonic voltage is adjusted to proper magnitude and phase it will produce an effect in the output circuit 11 exactly equal and opposite to the harmonic in the source 12, with the result that no harmonic current whatever will flow through said output circuit.

In particular, if the current in the potentiometer 54 is supplied by a full-wave rectifier 56, the principal harmonic in source 54 will be the second harmonic indicated by curve 1 of Fig. 1, and the voltage supplied by frequency-changer and phase modifier to control electrode 6 should be of the harmonic and phase represented by curve 2 of Fig. 1, as will be apparent to those skilled in the art and as explained in my parent application just mentioned.

It will also be evident that, since a lack of balance between the "voltage factor" and "magnetic factor" in cathode 7 produces effects of second harmonic frequency and phase indicated by either curve 1 or curve 2 in Fig. 1, the frequency-changer and phase modifier may be made to impress voltage on the control-electrode 6 capable of neutralizing such unbalance effect. Even though the four factors, described above as tending to produce ripple, cooperate to produce second harmonic effects of any phase, these alone, or in conjunction with second harmonic effects emanating from source 54, can be neutralized by a second harmonic voltage of proper magnitude and phase impressed on control-electrode 6 by frequency-changer and phase-modifier.

It will be evident that, in the usual case where the source 54 impresses a harmonic corresponding curve of Fig. 1, on the anode 5, it may be neutralized by employing a tube designed so that the "magnetic factor" corresponding to curve 2 of Fig. 1 predominates over the "voltage factor" in the right amount.

Analysis also shows that any magnetic field of the fundamental alternating frequency crossing the electron path between the cathode and the anode produces an effect corresponding to curve 2 of Fig. 1, and such an auxiliary field may be employed for all the balancing purposes to which curve 2 is described as applicable. Fig. 2 shows tubes arranged with windings suitable for setting up such magnetic fields, as will be described at greater length below.

Referring again to Fig. 2, the tube 51 may be one member of a cascade of amplifiers, oscillators or detectors, and the various factors tending to ripple production, and the principles and devices for neutralization are applicable in the case of each. Similar principles apply to the production and neutralization of ripple in the output circuit, except that, if ripple is not eliminated from the output of the immediately preceding tube of the cascade, the proportioning of the magnitude of the voltage and the magnetic factors and means of neutralization, and/or the adjustment of the magnetic field impressed on the electron paths of tube 51 by winding 52, may be made to take care of the harmonic effects of the input voltage along with the remaining factors producing harmonics.

The consequence of the consideration last named is that harmonic effects need not be eliminated in each tube in cascade individually but the adjustments may be made at any point in the chain to product neutralization of the net effect of all factors in the output of the final tube, where such is desired. It will then, in general, not be necessary to provide the above-described neutralizing means at any point in the system where it is not desired to eliminate harmonics; for example, the frequency-changer and the phase modifier may be linked to the grid of only the final tube of the cascade for most purposes.

It will also be understood that the effect of the harmonic in the input circuit 14 can be made to change through 180 degrees by reversing the transformer windings, although a signal will still be carried through the system in either connection. However, whether the input harmonic effect has the phase of curve 1 of Fig. 1, or of curve 2, of Fig. 1, it may, in any event, be neutralized by having either the "magnetic factor" or the "voltage factor" plus the effect of source 54 predominate over the other, as may be required. The polarity of the intertube transformer windings may thus be made as desired to meet other conditions, the ripple being eliminated by filament design.

If the voltage supplies for the anode circuit and the control-electrode circuit of a tube, such as 52, are from the same rectifier output, as is the case in Fig. 2, there is a second harmonic in the control-electrode voltage of such phase that it automatically tends to oppose the effect of the harmonic in the anode-circuit voltage. If the control-electrode voltage is so adjusted that its harmonic is 1/m times the anode-circuit voltage, wherein is the amplification factor of the tube, the two harmonics will balance their effects on the output circuit, and the output current will be devoid of ripple. Such an operation of tubes from a rectifier output potentiometer is, accordingly, one way of minimizing or completely avoiding ripple in the output current.

Since externally-induced magnetic fields of fundamental alternating-current frequency produce effects corresponding to curve 2 of Fig. 1, they may be employed to supplement the "magnetic factor" in all cases above mentioned. Thus, in Fig. 2, a three-electrode tube 51 is provided with a magnetizing winding 52, which may conveniently be coaxial with its electrodes, and which is supplied with a properly regulated amount of current from source 9 to give a second harmonic effect in the output circuit of the amount and phase needed to neutralize the effect of filament-heating current and/or ripple voltage-source 54. Phase modifier means, such as 55, for the current in winding 52 may be provided when desirable.

Reference numeral 56 denotes a full-wave rectifier somewhat like tube 52 of Fig. 2. A winding 57, fed from source 9 through variable impedance 58, is provided to neutralize the second harmonic in the output to potentiometer 54 in the same way as the predominant "magnetic factor" is described as doing in a preceding paragraph.

Negative-resistance elements of known type may, if desired, be inserted in series with the winding 52 or the winding 57 to neutralize the effect of the resistance, otherwise inherent in their circuits.

Fig. 3 shows a particular device for deriving second harmonic voltages. A tube 71, which may correspond to tube 52 of Fig. 2, has an anode 5, a control-electrode 6 and a cathode 7 supplied with heating current from alternating-current source 8, as in Fig. 2. The tube 71 also contains auxiliary electrode 72, which may be connected to one terminal of a battery 73, when desired, through the primary 74 of a transformer 75.

The secondary of the transformer 75 is provided with phase-modifying means 76 (when desired) and intercalated in the circuit of the control-electrode 6. The winding 74 will be found to carry a current of second harmonic frequency and phase corresponding to curve 1 of Fig. 1 and the voltage of the secondary winding may be made to serve the same purposes as does the output of frequency changer referred to in discussing Fig. 2 above.

The arrangement in Fig. 4 is particularly adapted to compensate for the effects of variations in the source of anode voltage of an electrical discharge tube, and is effective for both rapid periodic fluctuations and for relatively slow random fluctuations. Thus, the voltage divider 54 is supplied from a rectifier 56 having a hot cathode 38, anodes 34 and a winding 57 adapted to set up a magnetic field crossing the electron paths between the cathode and anodes. A tube 51, which may be an amplifier, detector, oscillator or other electrical discharge tube, has an anode 5, a control electrode 6 and a hot cathode 7 and is likewise provided with a winding 52 adapted to set up a magnetic field traversing the electron paths between anode and cathode. While the invention is applicable to tubes in which the hot cathodes 7 and 38 are energized from alternating-current supplies, it is effective also where the cathodes are supplied from some source of unvarying current.

Since the invention is applicable, regardless of the particular use of the tube 51, its control electrode circuit has been shown conventionally as provided with an input winding 14, but other circuit connections are equally available. Current for the windings 52 and 57 is supplied from the voltage divider 54 through variable impedances 53, 55 and 58. When, in the course of its periodicity or fluctuation, the voltage applied from the divider 54 to the anode 5 arises, the winding 52 is arranged to increase the strength of the magnetic field crossing the electron paths within the tube 51. This, in effect, increases the internal impedance between the anode 5 and cathode 7 and can be made to neutralize, completely if desired, the effect on the anode current of the increase in anode voltage. The percentage increase of current through the winding 52 can be made considerably greater than the percentage increase of the voltage of divider 54 by connecting a resistance 60 of positive temperature coefficient and a variable source of direct-current voltage 61 in series with each other and in shunt with a portion of the voltage divider 54. Alternatively element 60 may be a high-vacuum hot cathode tube operating sufficiently close to the saturation point of its volt-ampere curve so that a small percent rise in plate current requires a large percent increase of plate voltage. Such a voltage rise follows instantly any rise of current and this is desirable for most purposes. The current to the winding 52 is then tapped off, as indicated, between the remote end of the resistor 60 and a variable tap on the voltage source 61. Similarly, a source of variable direct-current voltage 63 may be provided in series with winding 52. By adjusting the position of the variable contacts intervening between the winding 52 and the voltage divider 54, the magnitude of the magnetic field set up by winding 52 for any given value of voltage impressed by its source between the anode 5 and cathode 7 of tube 51, and by varying the magnitudes of the variable voltages 63 and 61 relative to the impedances 53 and 55, the ratio between the percentage change in the magnetic field set up by winding 52 and the percentage change of voltage impressed on anode 5 and cathode 7 of tube 51 may be adjusted at will. Similar adjustments may be provided for in the circuit of winding 57 and the internal impedance of the rectifier 56 be increased through increasing the strength of the magnetic field set up by winding 57 whenever there is a tendency of the voltage across the terminals of voltage divider 54 to rise. It is usually desired to provide a filter comprising series reactors 64 and shunt condensers 65 which may be adjusted to eliminate or minimize any particular undesired frequency from the voltage drop across voltage-divider 54.

An alternative arrangement for minimizing and, if desired, completely neutralizing the effect of periodic variations or random fluctuations in the voltage of a source of uni-directional current supply for the anode and other electrodes of an electrical discharge tube is provided in connection with tube 71 which has an anode 5, an auxiliary electrode 6, a heated cathode 7 and a second auxiliary electrode 72. The tube 71 may be connected in electrical circuits for employment as either an amplifier or an oscillator or substantially for any other known mode of employment of such tubes, but, for purposes of illustration, is shown as having the circuit of its auxiliary electrode 72 provided with an input transformer 74 and a bias battery 73. Its cathode 7 may be heated by alternating current in accordance with the principles described above, but the compensating arrangements about to be described are equally applicable to tubes in which the cathode 7 is heated by invariable current.

The control electrode 6, which may be a conventional screen grid, suppressor grid or outer shielding grid, is supplied with voltage from a network energized from the voltage divider 54 which supplies the tube 71 with anode voltage. The electrode 6 may be so arranged that an increase of its voltage relative to the cathode will increase the internal impedance of the tube 71, as regards current flow between its cathode 7 and its anode 5; and this is particularly true if the electrode 6 is positioned to one side of the direct path of electrons between the cathode 7 and the anode 5. In accordance with the arrangement of tube 71, an increase of voltage of the divider 54 causes a higher voltage to be impressed upon the auxiliary electrode 6, thereby increasing the internal impedance between anode 5 and cathode 7 and neutralizing the tendency to increase of the anode current resulting from the increase of anode voltage. The percentage increase of voltage on electrode 6 may be made greater than the percentage increase of voltage applied by divider 54 to anode 5 by connecting the electrode 6, as indicated, to a variable tap on a source of variable direct-current voltage 77, which is connected in series with a resistance of positive temperature coefficient 78 and shunted across a variable portion of voltage divider 54. By proper positioning of the variable tap at 77 and the variable tap connecting the latter to voltage divider 54, the absolute magnitude and rate of variation of the potential of electrode 6 relative to the potential of anode 5 may be given any desired values.

Curves showing the rate of variation of internal impedance between anode 5 and cathode 7 with potential of auxiliary electrode 6; other curves showing the rate of variation for each particular setting of tap 77 and the taps to voltage divider 54 of the potential of anode 6 with the voltage drop at the variable tap connecting anode 5 to voltage source 54; and curves connecting the internal impedance between anode 5 and cathode 7 of tube 71 with the voltage drop impressed by the variable tap connected to anode 5 will make it possible to determine when the increase of impedance between cathode 7 and anode 5 caused by the change in potential of electrode 6 resulting from an increase in voltage across divider 54 is exactly the right amount needed to counteract the effect on current flow between cathode 7 and anode 5 of the rise in voltage of anode 5 due to the same increase in voltage across divider 54. The settings of taps 77 and 54 for which this compensating condition exists are obviously those which completely neutralize the effect on the anode current of tube 71 of change of voltage impressed on voltage divider 54. The circuits of tube 71, accordingly, provide a method by which the effect of changes in the anode voltage source on anode current of a tube may be completely neutralized. The same methods obviously make it possible to determine settings for taps to 77 and 54 which overcompensate or undercompensate in any desired degree the effect on anode current of variations in the anode voltage source. It is likewise obvious that such variations in the anode voltage source are compensated for by this arrangement, regardless of whether they are periodic, rapid, random, or slow.

Similar curves plotted to show the increase in impedance between anode 5 and cathode 7 of tube 51 required to neutralize the effect on anode current of a rise in voltage across voltage divider 54, and curves showing for each setting of the taps on variable impedance 53 and variable voltage sources 61 and 63 the effect on internal impedance of tube 51 resulting from an increase in voltage on divider 54, obviously make possible the determination of the setting of said variable taps which result in the impedance increase produced by winding 52 being equal to the impedance increase required to neutralize the effect of the increase of anode voltage on tube 51. The corresponding setting of the variable taps is, therefore, that for which the effect on the anode current of tube 51 resulting from variations in voltage across divider 54 being rendered nil or completely compensated. The same methods obviously make it possible to determine the settings of the aforesaid variable taps needed to overcompensate or undercompensate the effect on anode current of variations in voltage impressed on divider 54 to any desired degree.

It will be noted that the taps shown on the voltage-divider 54 may each be set at any position along its length to conform to the requirements of the arrangements above described.

In accordance with the patent statutes, I have described a particular embodiment of my invention, but it will be evident to those skilled in the art that the principles thereof are of broader application and many different ways of embodying them will be readily apparent. I, accordingly, desire that the following claims shall be given the broadest interpretation of which their terms are susceptible in view of the limitations imposed by the prior art.

I claim as my invention:

1. The method of neutralizing the effect of harmonics in the output of a rectifier connected to supply voltage to an electrode circuit of a triode which comprises impressing on the electron paths in said triode a magnetic field due to current of the frequency of the alternating current supply of said rectifier.

2. The method of neutralizing the effect of harmonics of the supply frequency in the output of a rectifier feeding current to a winding of a sound-producing device which includes the step of impressing, on the electron paths of a discharge path controlling current-flow to said device, a magnetic field of said supply frequency.

3. The method of neutralizing the effect of harmonics of the supply frequency in the output of a rectifier feeding current to an energy translating circuit through a multiplicity of electron paths controlling energy flow to said circuit, which includes the step of impressing, on said electron paths, a magnetic field of said supply frequency.

4. In combination with a rectifier and an electron discharge device drawing current therefrom, means for impressing on electron paths of said discharge device a magnetic field of the frequency of the alternating current supply of said rectifier.

5. The method of neutralizing the effect of fluctuations in the output of a rectifier connected to supply voltage to an electrode circuit of a triode which comprises impressing on the electron paths in said triode a magnetic field which varies synchronously with the anode voltage supply of said rectifier.

6. In combination with a rectifier connected to a source of fluctuating voltage and an electron discharge device drawing current therefrom, means for impressing on electron paths of said discharge device a magnetic field which varies synchronously with the voltage supply of said rectifier.

7. The method of neutralizing the effect of harmonics of the supply frequency in the output of a source feeding current to an energy translating circuit through a multiplicity of electron paths controlling energy flow to said circuit, which includes the step of impressing, on said electron paths, a deflecting field of said supply frequency.

8. In combination with a voltage source feeding energy to an energy-translating circuit through an electrical discharge device having a multiplicity of electron paths controlling energy flow from said source to said circuit, means for impressing on said electron paths a deflecting field of the frequency of said source for neutralizing the effect of harmonics of said frequency on energy flow in said translating circuit.

9. In combination with a rectifier connected to a voltage supply and feeding current to an energy-translating circuit through an electrical discharge device having a multiplicity of electron paths for controlling energy flow from said rectifier to said circuit, means for impressing on said electron paths a magnetic field of the frequency of said voltage supply for neutralizing the effect of harmonics of said frequency on energy flow in said translating circuit.

FREDERICK W. LYLE.